(12) United States Patent
Nieminen et al.

(10) Patent No.: US 10,075,529 B2
(45) Date of Patent: *Sep. 11, 2018

(54) METHOD AND APPARATUS FOR DISTRIBUTING SENSOR DATA

(71) Applicant: Nokia Technologies Oy, Espoo (FI)

(72) Inventors: Johanna Nieminen, Espoo (FI); Teemu Ilmari Savolainen, Nokia (FI); Markus Sakari Isomaki, Espoo (FI); Jari Mutikainen, Lepsama (FI)

(73) Assignee: Nokia Technologies Oy, Espoo (FI)

( * ) Notice: Subject to any disclaimer, the term of this patent is extended or adjusted under 35 U.S.C. 154(b) by 24 days.

This patent is subject to a terminal disclaimer.

(21) Appl. No.: 15/138,081

(22) Filed: Apr. 25, 2016

(65) Prior Publication Data

US 2016/0241646 A1    Aug. 18, 2016

Related U.S. Application Data

(63) Continuation of application No. 14/130,633, filed as application No. PCT/IB2011/001648 on Jul. 15, 2011, now Pat. No. 9,351,246.

(51) Int. Cl.
*H04L 29/08* (2006.01)
*H04W 52/02* (2009.01)
(Continued)

(52) U.S. Cl.
CPC ............ *H04L 67/12* (2013.01); *G06F 3/0484* (2013.01); *H04L 45/74* (2013.01); *H04W 4/70* (2018.02);
(Continued)

(58) Field of Classification Search
CPC ......... H04L 29/08558; H04L 29/12962; H04L 61/6081; H04L 67/12; H04L 12/18;
(Continued)

(56) References Cited

U.S. PATENT DOCUMENTS 7,817,994 B2    10/2010  Funk et al.
9,351,246 B2     5/2016  Nieminen et al.
(Continued)

FOREIGN PATENT DOCUMENTS

CN    101442551 A    5/2009
EP      1199860 A1    4/2002
(Continued)

OTHER PUBLICATIONS

Decuir, "Bluetooth 4.0: Low Energy", Chapters Comsoc Organization, 2010, 62 pages.

(Continued)

*Primary Examiner* — Benjamin H Elliott, IV
(74) *Attorney, Agent, or Firm* — Mintz Levin Cohn Ferris Glovsky and Popeo, P.C.

(57) ABSTRACT

Various methods for distributing a single stream of sensor data to one or more services are provided. One example method may include maintaining an association between sensor data and one or more services requesting the sensor data. The method of this example embodiment may further comprise receiving the sensor data. The example method may further comprise generating one or more copies of the sensor data. The example method may also comprise providing for distribution of the copies of the sensor data to the services requesting the sensor data, such that a copy of the sensor data is provided for distribution to each of the services requesting the sensor data. Similar and related example methods, example apparatuses, and example computer program products are also provided.

17 Claims, 8 Drawing Sheets

(51) Int. Cl.
  *G06F 3/0484* (2013.01)
  *H04L 12/741* (2013.01)
  *H04W 4/70* (2018.01)
  *H04W 84/18* (2009.01)

(52) U.S. Cl.
  CPC ........ *H04W 52/0209* (2013.01); *H04W 84/18* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/166* (2018.01); *Y02D 70/26* (2018.01)

(58) Field of Classification Search
  CPC .......... H04L 12/1845; H04L 29/12292; H04L 45/16; H04L 47/15; H04L 47/806; H04L 49/201; H04L 61/2069; H04L 29/06455; H04L 65/4076; H04W 4/005; H04W 84/18
  See application file for complete search history.

(56) References Cited

U.S. PATENT DOCUMENTS

| | | |
|---|---|---|
| 2007/0282944 A1 | 12/2007 | Odaka et al. |
| 2008/0243440 A1 | 10/2008 | Matsumoto et al. |
| 2008/0259919 A1 | 10/2008 | Monga |
| 2009/0141741 A1 | 6/2009 | Kim et al. |
| 2010/0080206 A1 | 4/2010 | Yamada |
| 2010/0293320 A1 | 11/2010 | Li et al. |
| 2012/0082159 A1 | 4/2012 | Taft et al. |
| 2012/0287932 A1 | 11/2012 | Haddad et al. |
| 2013/0006435 A1 | 1/2013 | Berrios et al. |

FOREIGN PATENT DOCUMENTS

| | | |
|---|---|---|
| KR | 20070008436 A | 1/2007 |
| WO | WO-2008026804 A1 | 3/2008 |
| WO | WO-2011008076 A1 | 1/2011 |

OTHER PUBLICATIONS

Hurni et al., "A Secure Remote Authentication, Operation and Management Infrastructure for Distributed Wireless Sensor Network Testbed", Proceedings of the Workshop on Global Sensor Networks, Electronic Communications of the EASST, vol. 17, 2009, 7 pages.

Isomaki et al., "Connecting BT-LE Sensors to the Internet Using Ipv6", IAB organisation, Retrieved on Aug. 16, 2014, Webpage available at : http://www.iab.org/about/workshops/smartobjects/papers/Nieminen.pdf.

Kapadia et al., "Secure Cloud Computing With Brokered Trusted Sensor Networks", International Symposium on Collaborative Technologies and Systems, May 17-21, 2010, 11 pages.

Lee et al., "Design of Network Management Platform and Security Framework for WSN", IEEE International Conference on Signal Image Technology and Internet Based Systems, Nov. 30-Dec. 3, 2008, pp. 640-645.

Luk et al., "MiniSec: A Secure Sensor Network Communication Architecture", 6th International Symposium on Information Processing in Sensor Networks, Apr. 25-27, 2007, 10 pages.

Nieminen et al., "Transmission of Ipv6 Packets Over Bluetooth Low Energy", Internet-Draft, Intended status: Standards Track, Apr. 19, 2011, pp. 1-13.

METHOD AND APPARATUS FOR DISTRIBUTING SENSOR DATA

RELATED APPLICATION

This application is a continuation of U.S. application Ser. No. 14/130,633 filed Jan. 2, 2014 which was originally filed as PCT Application No. PCT/IB2011/001648 filed Jul. 15, 2011.

TECHNICAL FIELD

Embodiments of the present invention relate generally to communication technology, and, more particularly, relate to a method, apparatus, and computer program product for distributing a single stream of sensor data to one or more services.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to improve and expand information transfer and convenience, telecommunication industry service providers are developing enhancements to existing networks. In this regard, for example, various technologies related to wireless communications over short distances are being developed and advanced. With the transition to Internet protocol version 6 (IPv6), the number of available Internet addresses will increase exponentially. As a result, the number of devices, such as those implementing short distance wireless technology, that may be connected to the Internet and assigned unique IP addresses will also increase significantly.

One particular branch of the short distance wireless communication technology involves the use of low energy consumption standards, such as Bluetooth™ low energy wireless technology, IPv6 over Low power Wireless Personal Area Networks (6LoWpan), and the like. These technologies enable low-power devices to be connected cheaply and efficiently while helping realize the vision of creating an Internet of Things. The low-power devices likely to benefit belong to any number of innovative industries including automotive, consumer wellness, smart energy, entertainment, home automation, security and proximity, sports and fitness, and more.

As the number of short distance wireless technology capable devices and associated services provided to these devices increases, the amount of power required to communicate between the devices and a network also increases. Accordingly, it may be desirable to provide solutions for reducing power consumption by these devices, for example by providing systems, methods, apparatuses, and computer program products for distributing a single stream of sensor data to one or more services.

SUMMARY

A networked system may comprise various sensors, such as Bluetooth™ low energy sensors, and various Internet services desiring to receive data from the various sensors. In many cases, more than one Internet service may request data from the same sensor. Rather than requiring the low energy sensors to transmit multiple copies of the sensor data to each of the requesting Internet services, which may consume a great deal of power, the sensor may transmit a single stream of sensor data to a gateway device, such as a mobile phone or home gateway. The gateway may be configured to receive the single stream of sensor data from the sensor and distribute a copy of the data to each of the requesting Internet services, thereby offloading high power consumption tasks from the sensor. The amount of energy-consuming configuration required at the sensor may also be reduced by again offloading the tasks to the gateway. In particular, the gateway may permit a user of the gateway to manage the various connections to the sensors and Internet services, while further configuring attachments between the sensors and one or more of the Internet services.

In certain instances, some of the Internet services may request to receive sensor data from the sensor at different intervals, or frequencies. The gateway may collect the requested frequencies for each of the Internet services and determine the highest frequency requested. The gateway may then transmit a message to the sensor requesting that the sensor transmit sensor data to the gateway at that highest frequency. For each Internet service, the stream of sensor data may then be filtered, or sampled, by the gateway to match the requested frequency of the respective Internet service. The gateway may then transmit the sampled stream of sensor data to the Internet service. For example, if a first Internet service requested sensor data every six seconds and a second Internet service requested sensor data every two seconds, the gateway may request that the sensor send sensor data every two seconds (i.e., at the higher frequency of the two frequencies requested). The gateway may then transmit all of the received sensor data to the second Internet service, but only every third packet of sensor data to the first Internet service.

Methods, apparatuses, and computer program products are herein provided for distributing a single stream of sensor data to one or more services. Systems, methods, apparatuses, and computer program products in accordance with various embodiments may provide several advantages to computing devices, computing device users, and network providers. Some example embodiments advantageously enable a low energy sensor to transmit a single stream of sensor data to a gateway to be distributed to multiple recipients. In this regard, the sensor may conserve a significant amount of energy. In accordance with some example embodiments, a sensor may establish a secure connection with the gateway, and the gateway may establish a secure connection with each of the services. In this regard, a sensor may be able to trust the secure connection with the gateway and also trust that the gateway has established secure connections with the services, thereby allowing the sensor to eliminate the need for implementing stacks related to security in the upper Open Systems Interconnection (OSI) model layers of the sensor. Additionally, according to example embodiments, by allowing the user to configure the attachments of a sensor with the services at the gateway, the complexity of the low power sensor may be reduced. In various embodiments of the present invention, the system may be implemented according to IPv6.

In an example embodiment, a method is provided, which may comprise maintaining an association between sensor data and one or more services requesting the sensor data. The method of this example embodiment may further comprise receiving the sensor data. The method of this example embodiment may additionally comprise generating one or more copies of the sensor data. The method of this example embodiment may further comprise providing for distribution of the one or more copies of the sensor data to the one or more services requesting the sensor data. One of the one or more copies of the sensor data may be provided for distribution to each of the one or more services requesting the sensor data. In another embodiment, a computer program may be provided for executing the various operations of the example method.

In another example embodiment, an apparatus comprising at least one processor and at least one memory storing computer program code is provided. The at least one memory and stored computer program code may be configured, with the at least one processor, to cause the apparatus of this example embodiment to at least maintain an association between sensor data and one or more services requesting the sensor data. The at least one memory and stored computer program code may be configured, with the at least one processor, to further cause the apparatus of this example embodiment to receive the sensor data. The at least one memory and stored computer program code may be configured, with the at least one processor, to additionally cause the apparatus of this example embodiment to generate one or more copies of the sensor data. The at least one memory and stored computer program code may be configured, with the at least one processor, to further cause the apparatus of this example embodiment to provide for distribution of the one or more copies of the sensor data to the one or more services requesting the sensor data. One of the one or more copies of the sensor data may be provided for distribution to each of the one or more services requesting the sensor data.

In another example embodiment, a computer program product is provided. The computer program product of this example embodiment may comprise at least one computer-readable storage medium having computer-readable program instructions stored therein. The program instructions of this example embodiment may comprise program instructions configured to maintain an association between sensor data and one or more services requesting the sensor data. The program instructions of this example embodiment may further comprise program instructions configured to receive the sensor data. The program instructions of this example embodiment may further comprise program instructions configured to generate one or more copies of the sensor data. The program instructions of this example embodiment may further comprise program instructions configured to provide for distribution of the one or more copies of the sensor data to the one or more services requesting the sensor data. One of the one or more copies of the sensor data may be provided for distribution to each of the one or more services requesting the sensor data.

In another example embodiment, an apparatus is provided, which may comprise means for maintaining an association between sensor data and one or more services requesting the sensor data. The apparatus of this example embodiment may further comprise means for receiving the sensor data. The apparatus of this example embodiment may further comprise means for generating one or more copies of the sensor data. The apparatus of this example embodiment may further comprise means for providing for distribution of the one or more copies of the sensor data to the one or more services requesting the sensor data. One of the one or more copies of the sensor data may be provided for distribution to each of the one or more services requesting the sensor data.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
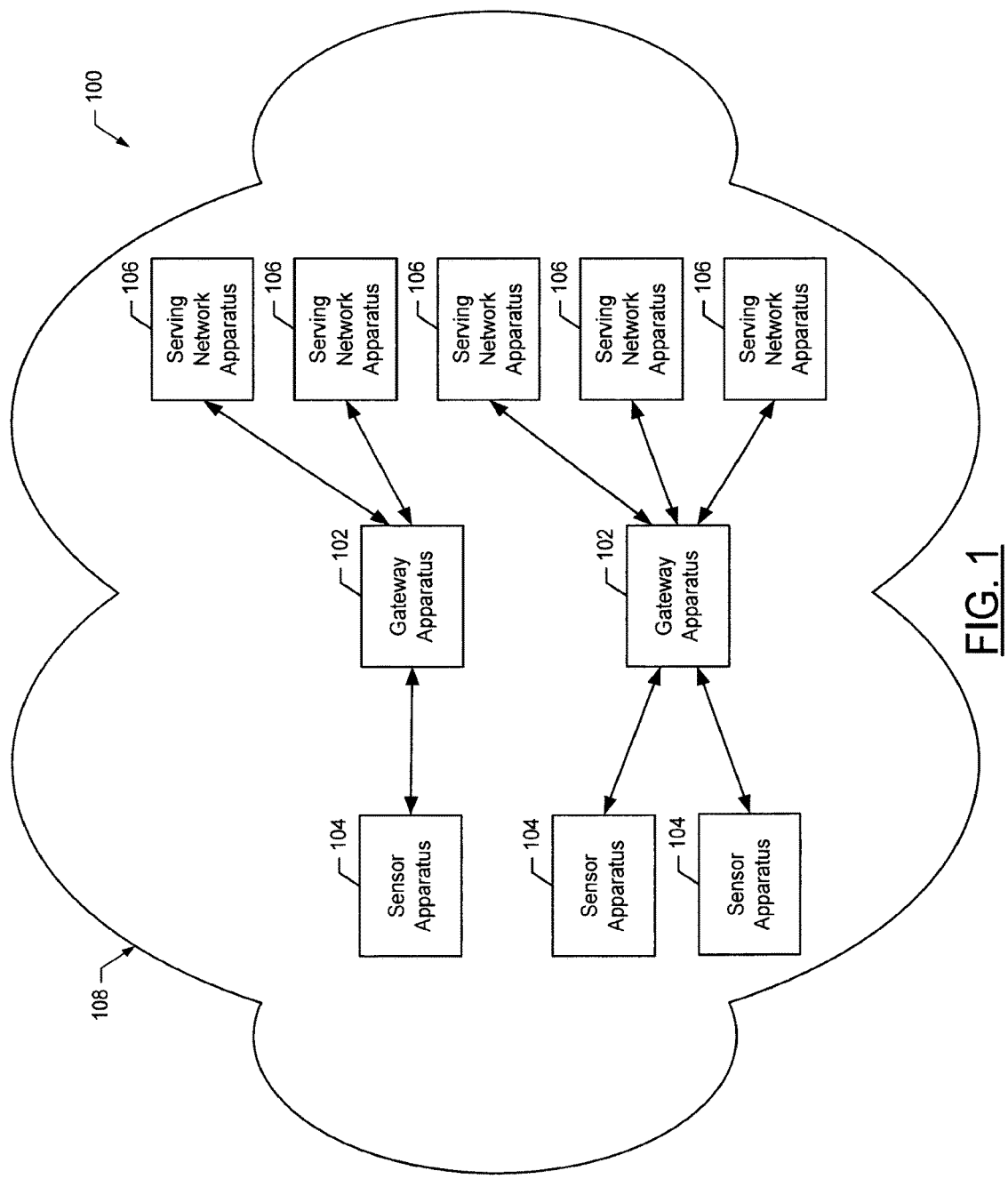
FIG. 1 illustrates a system for distributing a single stream of sensor data to one or more services according to some example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Referring now to FIG. 1, FIG. 1 illustrates a block diagram of a system 100 for distributing a single stream of sensor data to one or more services according to an example embodiment. It will be appreciated that the system 100 as well as the illustrations in other figures are each provided as an example of one embodiment and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for distributing a single stream of sensor data to one or more services, numerous other configurations may also be used to implement embodiments of the present invention.

The system 100 may include one or more gateway apparatuses 102 that are configured to distribute data from one or more sensor apparatuses 104 to one or more serving network apparatuses 106. The system 100 may further comprise a network 108. The network 108 may comprise one or more wireline networks, one or more wireless networks, or some combination thereof. The network 108 may comprise, in certain embodiments, one or more of the gateway apparatuses 102, sensor apparatuses 104, and serving network apparatuses 106 themselves, as shown in the example embodiment illustrated in FIG. 1. In some embodiments, the network 108 comprises a public land mobile network (for example, a cellular network), such as may be implemented by a network operator (for example, a cellular access provider). The network 108 may operate in accordance with universal terrestrial radio access network (UTRAN) standards, evolved UTRAN (E-UTRAN) standards, current and future implementations of Third Generation Partnership Project (3GPP) LTE (also referred to as LTE-A) standards, and/or the like. It will be appreciated, however, that where references herein are made to a network standard and/or terminology particular to a network standard, the references are provided merely by way of example and not by way of limitation.

According to various embodiments, one or more gateway apparatuses 102 may be configured to connect directly with one or more sensor apparatuses 104 and/or one or more serving network apparatuses 106 via, for example, an air interface without routing communications via one or more elements of the network 108. Alternatively, one or more of the gateway apparatuses 102 may be configured to communicate with one or more sensor apparatuses 104 and/or one or more of the serving network apparatuses 106 over the network 108. In this regard, the one or more sensor apparatuses 104 and/or serving network apparatuses 106 may embody one or more nodes of the network 108. For example, in some example embodiments, the one or more sensor apparatuses 104 and/or serving network apparatuses 106 may be at least partially embodied on one or more computing devices that comprise an element of a radio access network (RAN) portion of the network 108. In this regard, the sensor apparatuses 104 may, for example, be at least partially embodied as a Bluetooth low energy sensor, 6LoWpan sensor, Wi-Fi low energy sensor, and/or the like, which may, for example, be configured to provide sensor data. The serving network apparatuses 106 may, for example, be at least partially embodied on an access point of the network 108 (for example, a macrocell, microcell, picocell, femtocell, closed subscriber group (CSG) cell, base station, base transceiver station (BTS), node B, evolved node B, and/or the like), which may, for example, be configured to provide access to the network 108 (e.g., via a radio uplink) to one or more of the gateway apparatuses 102. Accordingly, each of the serving network apparatuses 106 may comprise a network node or a plurality of network nodes collectively configured to perform one or more operations attributed to the serving network apparatus 106 as described with respect to various example embodiments disclosed herein.

A gateway apparatus 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), any combination thereof, and/or the like. In some embodiments, the gateway apparatus 102 may be embodied as a router, home gateway node, or any other gateway device. In an example embodiment, a gateway apparatus 102 may be embodied as a mobile terminal, such as that illustrated in FIG. 2.

Figure 2:
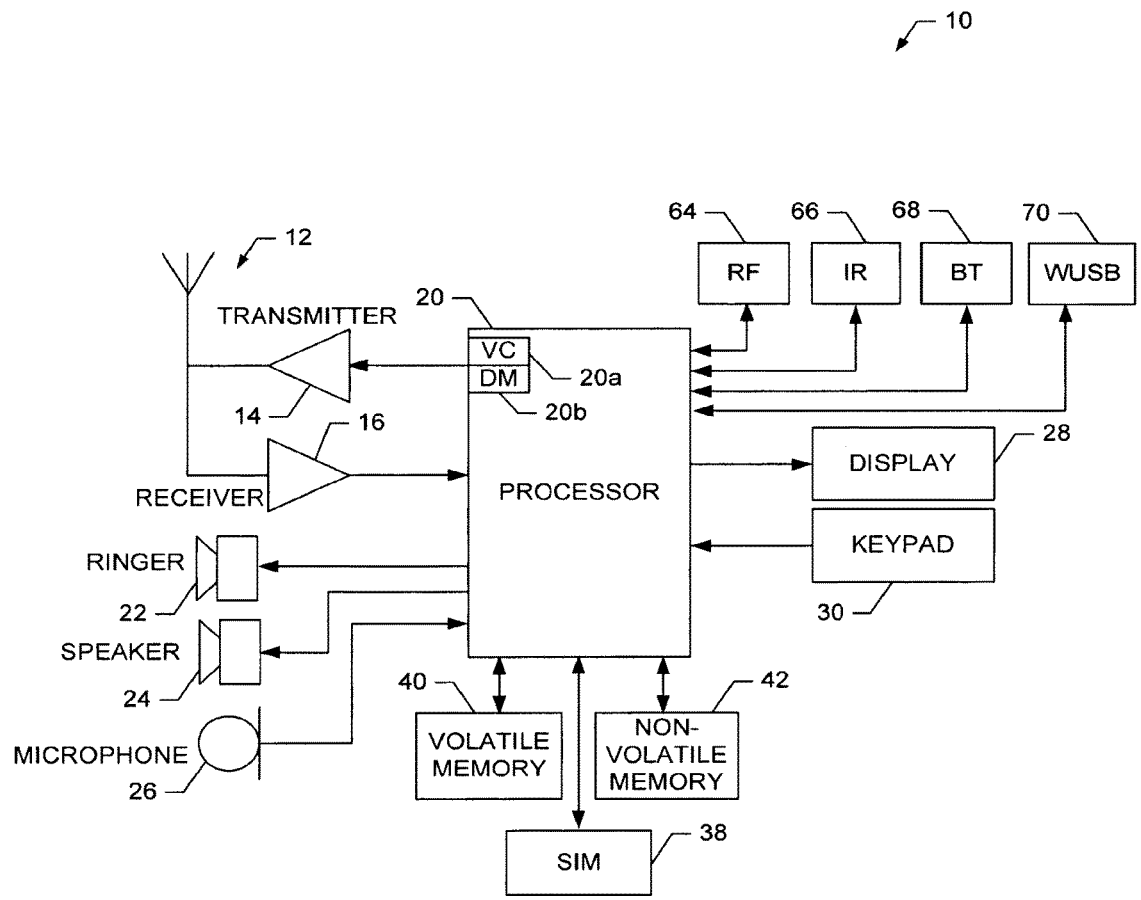
FIG. 2 illustrates a schematic block diagram of a mobile terminal according to some example embodiments of the present invention.

In this regard, FIG. 2 illustrates a block diagram of a mobile terminal 10 representative of one embodiment of a gateway apparatus 102. It should be understood, however, that the mobile terminal 10 illustrated and hereinafter described is merely illustrative of one type of gateway apparatus 102 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, routers, home gateways, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power or ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
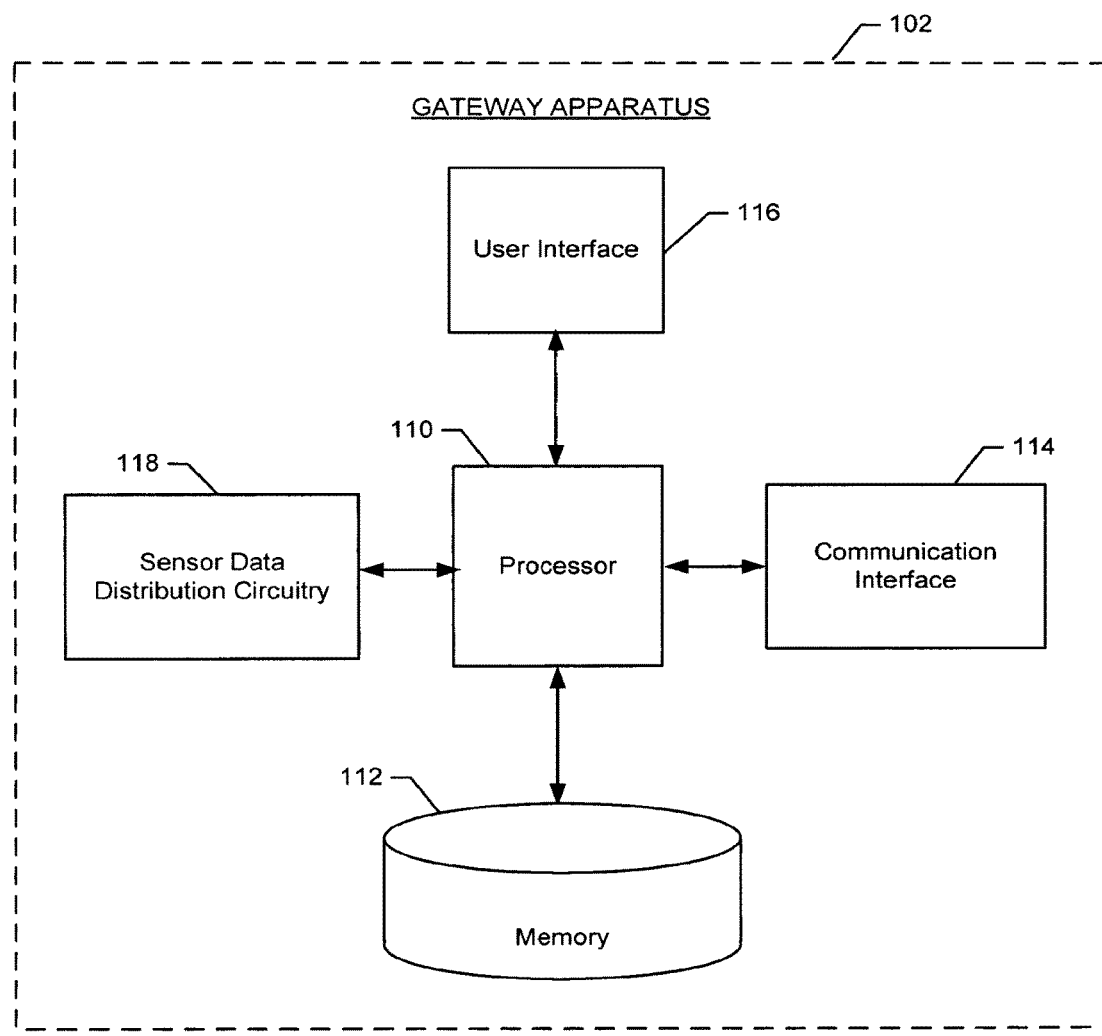
FIG. 3 illustrates a block diagram of a gateway apparatus according to some example embodiments of the present invention.

Referring now to FIG. 3, FIG. 3 illustrates a block diagram of a gateway apparatus 102 according to an example embodiment. In the example embodiment, the gateway apparatus 102 includes various means for performing the various functions herein described. These means may comprise one or more of a processor 110, memory 112, communication interface 114, user interface 116, or sensor data distribution circuitry 118. The means of the gateway apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 112) that is executable by a suitably configured processing device (e.g., the processor 110), or some combination thereof.

In some example embodiments, one or more of the means illustrated in FIG. 3 may be embodied as a chip or chip set. In other words, the gateway apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or sensor data distribution circuitry 118 may be embodied as a chip or chip set. The gateway apparatus 102 may therefore, in some example embodiments, be configured to implement embodiments of the present invention on a single chip or as a single "system on a chip." As another example, in some example embodiments, the gateway apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 110 comprises a plurality of processors. The plurality of processors may be in operative communication with each other and may be collectively configured to perform one or more functionalities of the gateway apparatus 102 as described herein. The plurality of processors may be embodied on a single computing device or distributed across a plurality of computing devices collectively configured to function as the gateway apparatus 102. In embodiments wherein the gateway apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the gateway apparatus 102 to perform one or more of the functionalities of the gateway apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the gateway apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the gateway apparatus 102 is embodied as a mobile terminal 10, the memory 112 may comprise the volatile memory 40 and/or the non-volatile memory 42. The memory 112 may be configured to store information, data, applications, instructions, or the like for enabling the gateway apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the sensor data distribution circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the gateway apparatus 102 and one or more computing devices or computing resources may be in communication. As an example, the communication interface 114 may be configured to enable communication between the gateway apparatus 102 and another device, such as another gateway apparatus 102. As a further example, the communication interface 114 may be configured to enable communication with a serving network apparatus 106 and/or a sensor apparatus 104, in some instances via the network 108. The communication interface 114 may additionally be in communication with the memory 112, user interface 116, and/or sensor data distribution circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or sensor data distribution circuitry 118, such as via a bus.

The sensor data distribution circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the sensor data distribution circuitry 118 is embodied separately from the processor 110, the sensor data distribution circuitry 118 may be in communication with the processor 110. The sensor data distribution circuitry 118 may further be in communication with one or more of the memory 112, communication interface 114, or user interface 116, such as via a bus.

In some example embodiments, the sensor data distribution circuitry 118 may be configured to provide for connection with one or more serving network apparatuses 106. The connection established between the sensor data distribution circuitry 118 and a serving network apparatus 106 may be a secure connection. For example, the connection may be established according to a cryptographic protocol, such as Transport Layer Security (TLS), Internet Protocol Security (IPSec), and/or the like. In some embodiments, the sensor data distribution circuitry 118 may be configured to connect with one or more Internet services provided over the one or more serving network apparatuses 106.

According to example embodiments, the sensor data distribution circuitry 118 may be configured to provide for connection with one or more sensor apparatuses 104. For example, the sensor data distribution circuitry 118 may be configured to pair with the sensor apparatus 104. The connection between the sensor data distribution circuitry 118 and a sensor apparatus 104 may be a secure connection. For example, the connection may be established according to link layer security mechanisms, such as user authentication, frame encryption, and data integrity verification.

In various embodiments, the connections between the sensor data distribution circuitry 118 and the sensor apparatuses 104 and/or Internet services provided over the serving network apparatuses 106 may be established and managed via a user interface provided to a user. The user interface may be, for example, a graphical user interface or a web-based user interface accessible via a network (e.g., network 108). In this regard, the user interface may permit a user to add the one or more Internet services provided through the serving network apparatuses 106. For example, the user interface may provide for display to the user of one or more Internet services (e.g., via a list) available via the serving network apparatuses 106, and the user may select one or more of the Internet services to which a connection is desired. The user interface may further allow a user to accept a pairing connection from the one or more connecting sensor apparatuses 104. For example, in an instance in which a sensor apparatus 104 attempts to connect to the gateway apparatus 102 associated with the sensor data distribution circuitry 118, the user interface may display the incoming connection to the user for the user to decide whether to accept a pairing connection from the sensor apparatus 104. In other embodiments, the sensor data distribution circuitry 118 may detect one or more sensor apparatuses 104 to which a pairing may be established and display the available sensor apparatuses 104 via the user interface (e.g., via a list) for the user to decide whether to request a pairing connection with one or more of the sensor apparatuses 104.

According to some embodiments, the user interface provided by the sensor data distribution circuitry 118 may allow a user to attach one or more sensor apparatuses 104 with one or more Internet services provided via the serving network apparatuses 106. In this regard, the sensor data distribution circuitry 118 may be configured to maintain information related to the various attachments between the sensor apparatuses 104 and Internet services provided via the serving network apparatuses 106. Each sensor apparatus 104 and/or Internet service may have one or more associated parameters. For example, an Internet service may have an associated parameter specifying the particular frequency at which it should receive sensor data (e.g., once every second). The sensor data distribution circuitry 118 may be configured to receive and store the various parameters associated with the sensor apparatuses 104 and Internet services.

In various embodiments, connection, configuration, and/or attachment of the sensors and services may occur without user intervention (e.g., without using the user interface). In this regard, the sensor data distribution circuitry 118 may be configured to automatically accept any pairing connection from a connecting sensor apparatus 104. For example, the sensor data distribution circuitry 118 may accept a pairing connection from a sensor apparatus 104 received via Near Field Communication (NFC) when the sensor apparatus 104 is within a particular distance from the gateway apparatus 102 associated with the sensor data distribution circuitry 118. In certain embodiments, the sensor data distribution circuitry 118 may be configured to automatically connect with the one or more services provided over the one or more serving network apparatuses 106. According to some embodiments, the connections may not be secure, for example, a sensor apparatus 104 may provide data to any device within range. In example embodiments, the sensor data distribution circuitry 118 may be configured to automatically attach the one or more sensor apparatuses 104 with the one or more services. In some instances, the sensor data distribution circuitry 118 may be configured to automatically connect to a subset of the available sensors and services and/or to automatically attach a subset of the sensor apparatuses 104 with one or more of the services, for example, based on a configuration list.

In example embodiments, the sensor data distribution circuitry 118 may determine that one sensor apparatus 104 is attached to a plurality of Internet services. The sensor data distribution circuitry 118 may analyze the parameters associated with the sensor apparatus 104 and each of the plurality of Internet services. In this regard, the sensor data distribution circuitry 118 may access the sensor data frequency parameters received from each of the plurality of Internet services. The sensor data distribution circuitry 118 may determine the highest frequency associated with any of the Internet services. For example, if a first Internet service requested sensor data once every five seconds, a second Internet service request sensor data twice every second, and a third Internet service requested sensor data once every two seconds, the sensor data distribution circuitry 118 would determine that the highest frequency requested was twice every second (i.e., the frequency of the second Internet service). The sensor data distribution circuitry 118 may provide for transmission of a request for sensor data from the sensor apparatus 104 at the identified highest frequency.

According to various embodiments, the sensor data distribution circuitry 118 may be configured to receive a single stream of sensor data from a sensor apparatus 104 at the requested frequency (i.e., the highest frequency requested by any of the Internet services attached to the sensor apparatus 104). The sensor data distribution circuitry 118 may be configured to distribute the sensor data to the one or more attached Internet services at the requested frequency associated with each. To distribute the sensor data at the appropriate frequency, the sensor data distribution circuitry 118 may filter, or sample, the received data prior to distributing it. In some embodiments, for each attached Internet service, the received sensor data may be sampled by the sensor data distribution circuitry 118 and sent to the Internet service at the requested frequency.

A formula may be used by the sensor data distribution circuitry 118, in certain embodiments, to determine the sampling rate for a particular Internet service. For example, the sensor data distribution circuitry 118 may divide the requested frequency by the highest requested frequency to determine a value N. If the requested frequency is once every two seconds and the highest frequency is twice every second (i.e., once every 0.5 seconds), then N would equal 4 (i.e., 2÷½=4). The sensor data distribution circuitry 118 may only transmit every Nth packet, or message, of sensor data to the particular Internet service, or in this example only every $4^{th}$ packet. In this regard, the sensor data distribution circuitry 118 may ensure that sensor data is not sent to a particular Internet service more frequently than requested.

In some embodiments, aside from sampling down (i.e., sampling a subset of the received sensor data), the sensor data distribution circuitry 118 may be configured to sample up from the received data. In these embodiments, the sensor data distribution circuitry 118 may request that the sensor apparatus 104 send sensor data at a frequency less than the highest frequency requested by an attached Internet service. The sensor data distribution circuitry 118 may generate additional sensor data based on the received data for distributing to Internet services requiring a higher frequency of sensor data than the rate of sensor data sent by the sensor apparatus 104. According to example embodiments, the sensor data distribution circuitry 118 may duplicate the most recently received sensor data. In other embodiments, the sensor data distribution circuitry 118 may synthesize additional sensor data beyond the sensor data received. For example, the sensor data distribution circuitry 118 may generate new sensor data by estimating the new sensor data based at least in part on previously received sensor data.

The sensor data distribution circuitry 118 may distribute the sensor data received from a sensor apparatus 104 to the attached Internet services according to a number of methods. In various embodiments of a first method, the sensor data distribution circuitry 118 may copy the data (i.e., the payload) of the sensor data packet, or message, into a new message for each attached Internet service. According to certain embodiments of a second method, the sensor data distribution circuitry 118 may copy the entire sensor data packet, or message, and forward a copy to each attached Internet service. In example embodiments of a third method, the sensor data distribution circuitry 118 may receive the sensor data in the form of a multicast packet, or message, which it may multiply and distribute to each Internet service subscribed to the multicast group associated with the multicast address.

In embodiments according to the first method described above, the sensor data distribution circuitry 118 may be configured to extract the payload data from the packets received from the sensor apparatus 104. The sensor data distribution circuitry 118 may build new messages comprising the extracted payload data. In this regard, the sensor data distribution circuitry 118 may convert the data format of the original sensor data packet to a new format for the new packets. The transport layer session between the sensor apparatus 104 and the gateway apparatus 102 associated with the sensor data distribution circuitry 118 may be different from the transport layer session between the gateway apparatus 102 and the one or more serving network apparatuses 106 associated with the Internet services. For example, the sensor apparatus 104 may communicate with the gateway apparatus 102 over a User Datagram Protocol (UDP) session, while the gateway apparatus 102 may communicate with the serving network apparatus 106 over a Transmission Control Protocol (TCP) session. In other embodiments, the two sessions may be the same type, but the sensor data distribution circuitry 118 may establish a separate session of that type with each of the sensor apparatus 104 and the serving network apparatus 106. In example embodiments, the sensor apparatus 104 and the gateway apparatus 102 associated with the sensor data distribution circuitry 118 may use a different protocol from the one used between the gateway apparatus 102 and the one or more serving network apparatuses 106 associated with the Internet services. For example, the sensor apparatus 104 may communicate with the gateway apparatus 102 using the Constrained Application Protocol (CoAP), while the gateway apparatus 102 may communicate with the serving network apparatus 106 using the hypertext transfer protocol (HTTP). In other embodiments, the same protocol may be used in both connections.

Figure 6:
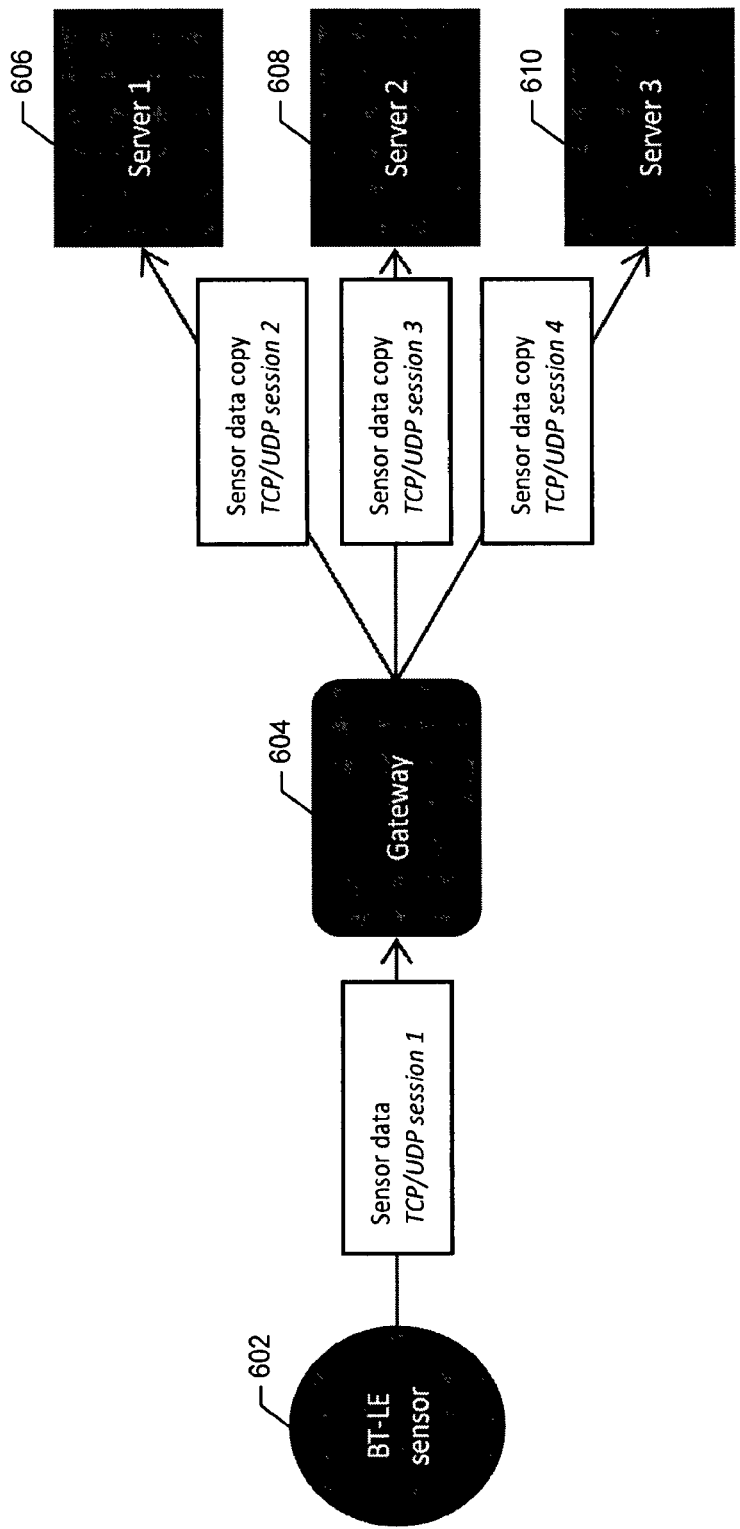
FIG. 6 illustrates an example embodiment for distributing a single stream of sensor data to one or more services according to the present invention.

FIG. 6 illustrates an example embodiment of the first method. It should be understood that the example embodiment illustrated and hereinafter described is merely illustrative of one embodiment of the present invention and, therefore, should not be taken to limit the scope of the disclosure. The sensor apparatus 104 depicted in the example embodiment comprises a Bluetooth™ low energy (BT-LE) sensor 602. In this example embodiment, the gateway apparatus 102 comprises gateway 604, and the serving network apparatuses 106 comprise server 1 (606), server 2 (608), and server 3 (610). In the example embodiment, BT-LE sensor 602 transmits sensor data over a first TCP or UDP session with gateway 604. Gateway 604 then extracts the payload data of the sensor data and generates three new packets, each containing a copy of the extracted payload data. The gateway 604 then transmits the copy of the sensor data over a separate TCP or UDP session for each of the three servers 606, 608, and 610.

In embodiments according to the second method described above, the sensor data distribution circuitry 118 may be configured to copy the entire sensor data packet, or message, and distribute the copies to the one or more Internet services. The original sensor data packet and the copies generated by the sensor data distribution circuitry 118 may be transmitted according to the same transport layer type and protocol. Both the original packets and the copies may also comprise the same data format. According to example embodiments, the original sensor data packets may comprise a destination address indicating the gateway apparatus 102 associated with the sensor data distribution circuitry 118. The sensor data distribution circuitry 118 may be configured to change the destination address of a copied sensor data packet to the address of the serving network apparatus 106 associated with the Internet service to which the sensor data distribution circuitry 118 is sending the copied sensor data packet. The sensor data distribution circuitry 118 may repeat this process of changing the destination address for each attached Internet service (i.e., the serving network apparatus 106 associated with the Internet service) for which a copied sensor data packet is destined.

Figure 7A:
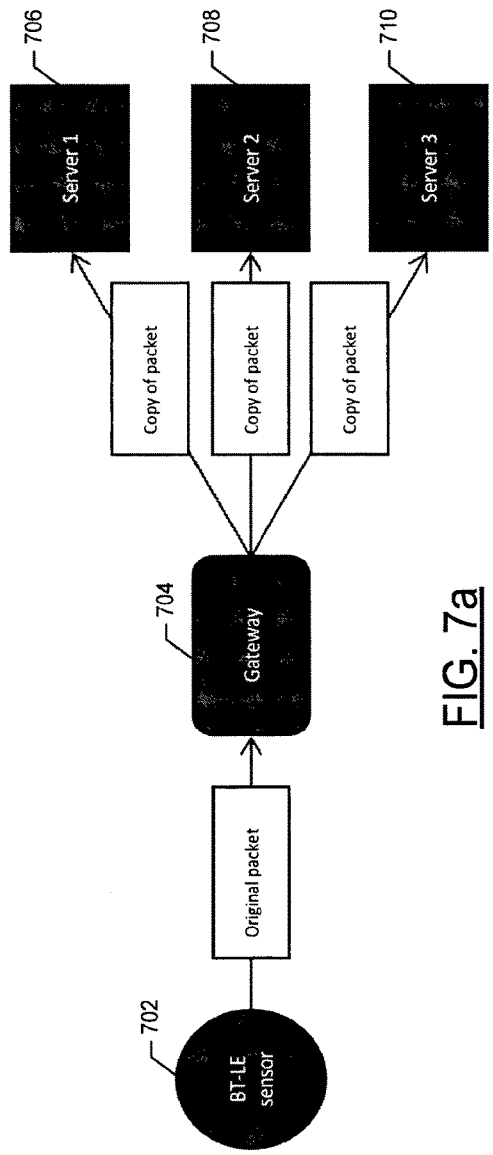
FIGS. 7a and 7b illustrate an example embodiment for distributing a single stream of sensor data to one or more services according to the present invention.
Figure 7B:
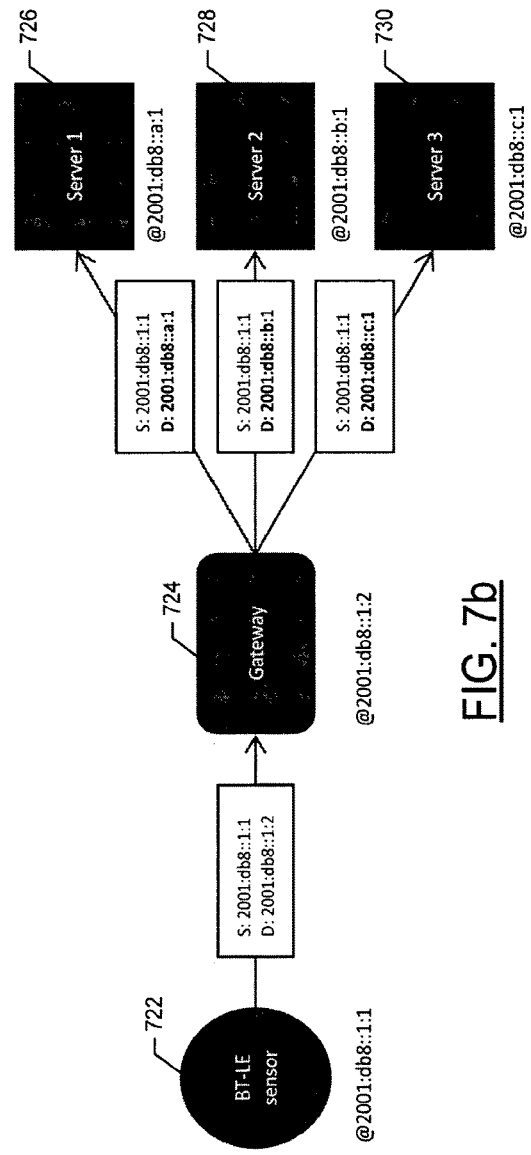

FIGS. 7a and 7b illustrate an example embodiment of the second method. It should be understood that the example embodiment illustrated and hereinafter described is merely illustrative of one embodiment of the present invention and, therefore, should not be taken to limit the scope of the disclosure. The sensor apparatus 104 depicted in the example embodiment comprises Bluetooth™ low energy (BT-LE) sensor 702, 722. In this example embodiment, the gateway apparatus 102 comprises gateway 704, 724, and the serving network apparatuses 106 comprise server 1 (706, 726), server 2 (708, 728), and server 3 (710, 730). In the example embodiment, BT-LE sensor 702, 722 transmits a packet of sensor data to gateway 704, 724. Gateway 704, 724 then copies the entire packet and transmits a copy to server 1 (706, 726), server 2 (708, 728), and server 3 (710, 730). FIG. 7b shows the address for each entity in the system (preceded by an "@" symbol) as well as the source and destination addresses of the sensor data packets. In this example embodiment, each packet, whether original or copied, maintains the same source address of the BT-LE sensor 722. As shown, the original sensor data packet has a destination address of the gateway 724. The gateway 724 then changes the destination address of each copied packet to match the address of the server (726, 728, 730) receiving the particular copied packet.

In embodiments according to the third method described above, the sensor data distribution circuitry 118 may be configured to multiply and distribute the multicast sensor data packets, or messages, received from the sensor apparatus 104 to each serving network apparatus 106 subscribed to the associated multicast group. In this regard, each serving network apparatus 106 associated with an attached Internet service may be subscribed to the multicast group associated with the multicast address specified as the destination address of the sensor data packet. The sensor data distribution circuitry 118 may copy the entire multicast sensor data packet and distribute it to the associated serving network apparatuses 106 without modifying the multicast sensor data packet (i.e., without changing the destination address). The sensor data distribution circuitry 118 may, in some embodiments, distribute the multicast sensor data packet via UDP.

According to certain embodiments, the sensor data distribution circuitry 118 may not be able to distribute the multicast sensor data packet by standard multicast means. In these embodiments, the sensor data distribution circuitry 118 may encapsulate the multicast sensor data packet in a new packet (e.g., a non-multicast datagram), modify the destination address of the new packet to correspond with an address of one of the plurality of serving network apparatuses 106 associated with an attached Internet service, and distribute the new packet to the serving network apparatus 106. This process may be repeated for each of the plurality of serving network apparatuses 106 associated with an attached Internet service. In some embodiments, the sensor data distribution circuitry 118 may generate copies of the multicast packet and, for each serving network apparatus 106 associated with an attached Internet service, modify the address from the multicast address to the address of the respective serving network apparatus 106.

Figure 8:
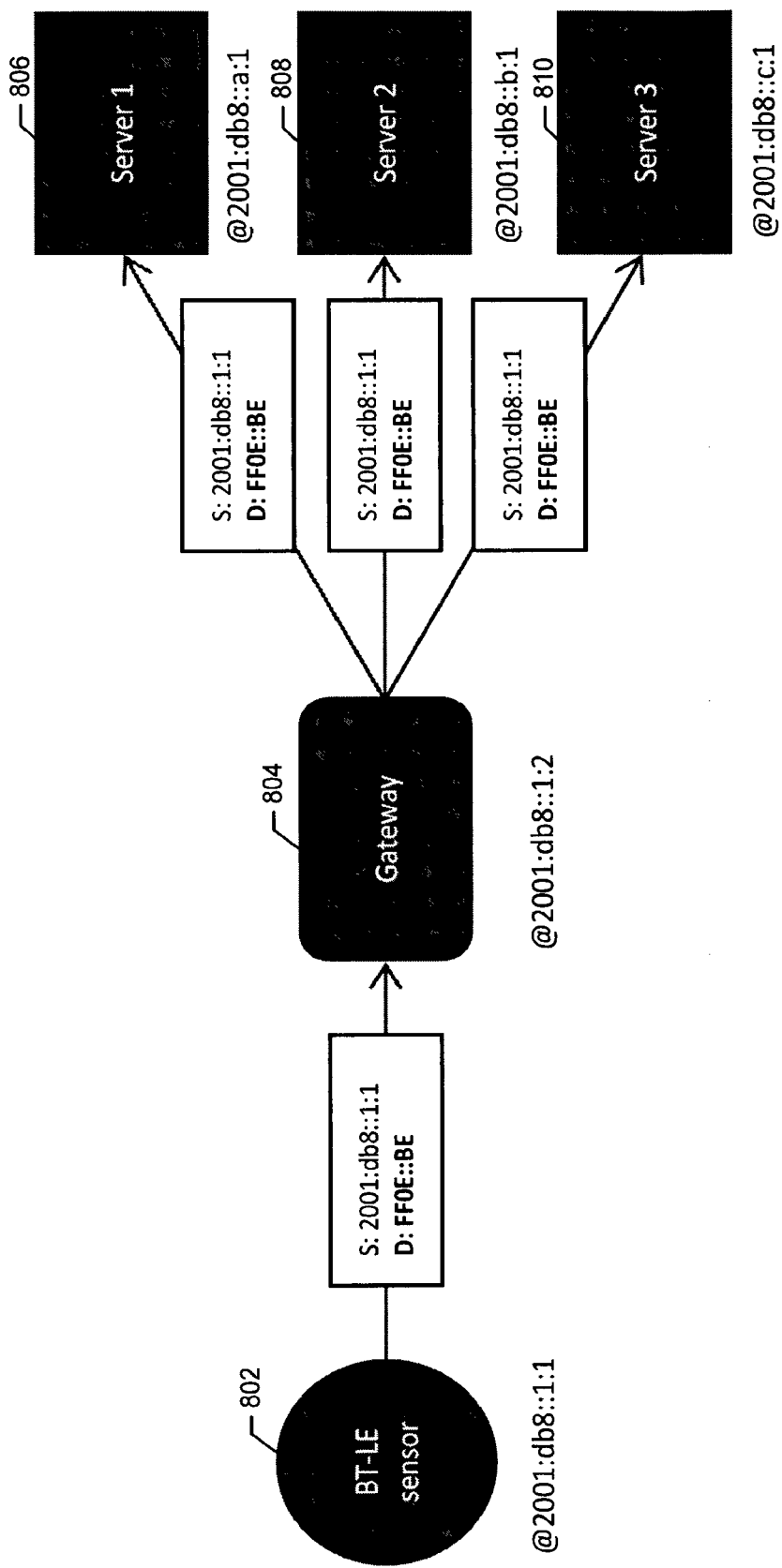
FIG. 8 illustrates an example embodiment for distributing a single stream of sensor data to one or more services according to the present invention.

FIG. 8 illustrates an example embodiment of the third method. It should be understood that the example embodiment illustrated and hereinafter described is merely illustrative of one embodiment of the present invention and, therefore, should not be taken to limit the scope of the disclosure. The sensor apparatus 104 depicted in the example embodiment comprises a Bluetooth™ low energy (BT-LE) sensor 802. In this example embodiment, the gateway apparatus 102 comprises gateway 804, and the serving network apparatuses 106 comprise server 1 (806), server 2 (808), and server 3 (810). In the example embodiment, BT-LE sensor 802 transmits a multicast sensor data packet to gateway 804. Gateway 804 then multiplies the multicast packet and transmits a copy to each of the three servers 806, 808, and 810. In this example embodiment, the BT-LE sensor 802 sets the destination address of the multicast sensor data packet to an IPv6 multicast address (i.e., FFOE::BE). After multiplying the multicast sensor data packet, the gateway 804 does not need to alter the destination address of the multicast packet, but rather sends a copy of the packet to each server 806, 808, 810 that has subscribed to the multicast group indicated by the multicast address.

It should be understood that while the above description specifically refers to three methods for distributing a single stream of sensor data to multiple services, other methods for implementing the distribution may be substituted without departing from the scope of the claimed invention. Accordingly, it will be appreciated that the above described example embodiments are merely examples and should not be construed to narrow the scope or spirit of the invention in any way.

Figure 4:
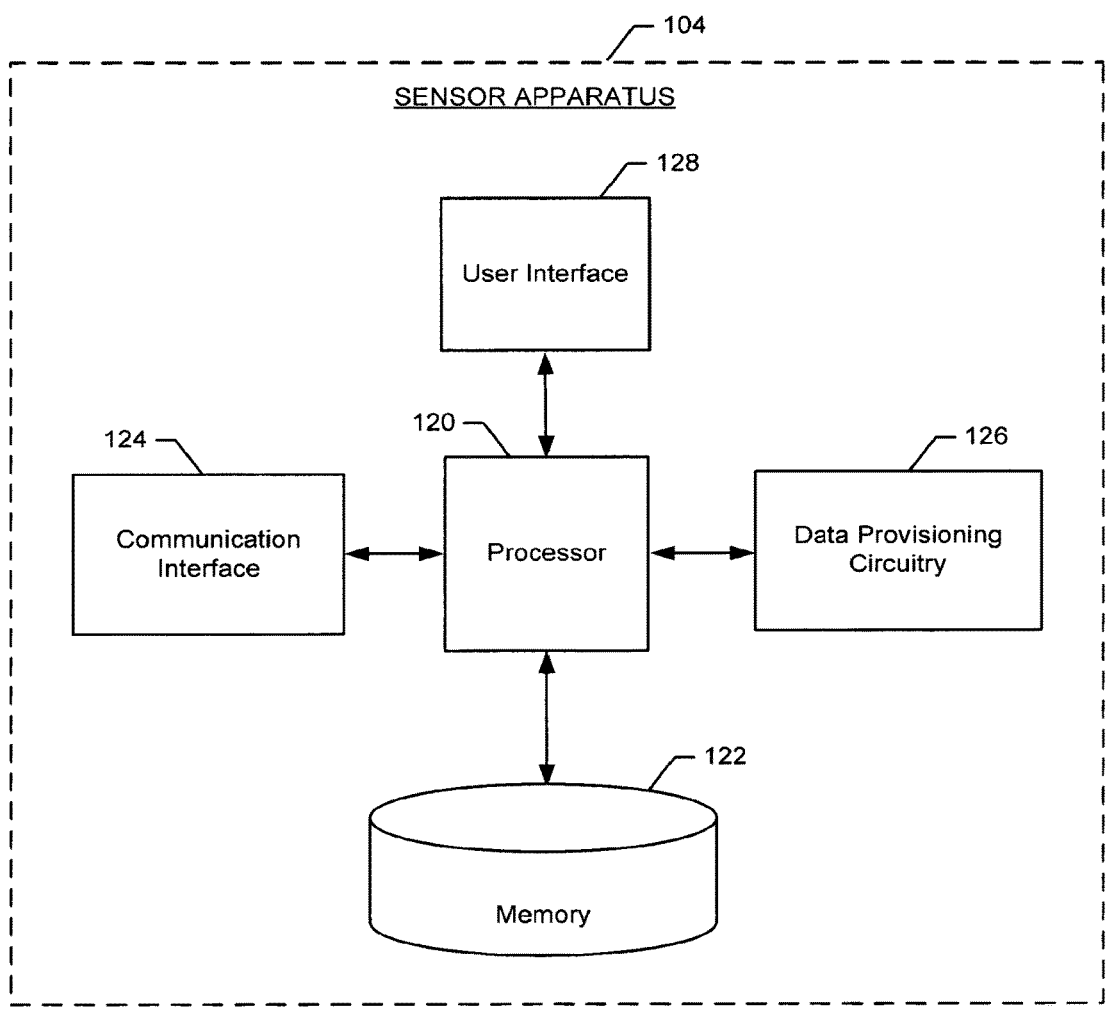
FIG. 4 illustrates a block diagram of a sensor apparatus according to some example embodiments of the present invention.

Referring now to FIG. 4, FIG. 4 illustrates a block diagram of a sensor apparatus 104 according to an example embodiment. In the example embodiment, the sensor apparatus 104 includes various means for performing the various functions herein described. These means may comprise one or more of a processor 120, memory 122, communication interface 124, user interface 128, or data provisioning circuitry 126. The means of the sensor apparatus 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 122) that is executable by a suitably configured processing device (e.g., the processor 120), or some combination thereof.

In some example embodiments, one or more of the means illustrated in FIG. 4 may be embodied as a chip or chip set. In other words, the sensor apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, user interface 128, and/or data provisioning circuitry 126 may be embodied as a chip or chip set. The sensor apparatus 104 may therefore, in some example embodiments, be configured to implement embodiments of the present invention on a single chip or as a single "system on a chip." As another example, in some example embodiments, the sensor apparatus 104 may comprise component(s) configured to implement embodiments of the present invention on a single chip or as a single "system on a chip." As such, in some cases, a chip or chipset may constitute means for performing one or more operations for providing the functionalities described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 120 comprises a plurality of processors. The plurality of processors may be in operative communication with each other and may be collectively configured to perform one or more functionalities of the sensor apparatus 104 as described herein. The plurality of processors may be embodied on a single computing device or distributed across a plurality of computing devices collectively configured to function as the sensor apparatus 104. In some example embodiments, the processor 120 is configured to execute instructions stored in the memory 122 or otherwise accessible to the processor 120. These instructions, when executed by the processor 120, may cause the sensor apparatus 104 to perform one or more of the functionalities of the sensor apparatus 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 4 as a single memory, the memory 122 may comprise a plurality of memories. The plurality of memories may be embodied on a single computing device or may be distributed across a plurality of computing devices collectively configured to function as the sensor apparatus 104. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the sensor apparatus 104 to carry out various functions in accordance with various example embodiments. For example, in some example embodiments, the memory 122 is configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the data provisioning circuitry 126 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the sensor apparatus 104 and one or more computing devices or computing resources may be in communication. As an example, the communication interface 124 may be configured to enable communication with a gateway apparatus 102 by the network 108, a radio uplink, and/or the like. The communication interface 124 may additionally be in communication with the memory 122, user interface 128, and/or data provisioning circuitry 126, such as via a bus.

The user interface 128 may be in communication with the processor 120 to receive an indication of a user input and/or to provide an audible, visual, mechanical, or other output to a user. As such, the user interface 128 may include, for example, a keyboard, a mouse, a joystick, a display, a touch screen display, a microphone, a speaker, and/or other input/output mechanisms. In embodiments wherein the user interface 128 comprises a touch screen display, the user interface 128 may additionally be configured to detect and/or receive indication of a touch gesture or other input to the touch screen display. The user interface 128 may be in communication with the memory 122, communication interface 124, and/or sensor data distribution circuitry 126, such as via a bus.

The data provisioning circuitry 126 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In embodiments wherein the data provisioning circuitry 126 is embodied separately from the processor 120, the data provisioning circuitry 126 may be in communication with the processor 120. The data provisioning circuitry 126 may further be in communication with one or more of the memory 122, communication interface 124, or user interface 128, such as via a bus.

In example embodiments, the data provisioning circuitry 126 may be configured to provide for connection with one or more gateway apparatuses 102. The connection established between the data provisioning circuitry 126 and a gateway apparatus 102 may be a secure connection. For example, the data provisioning circuitry 126 may be configured to pair with the gateway apparatus 102. The connection between the data provisioning circuitry 126 and a gateway apparatus 10 may be a secure connection. For example, the connection may be established according to link layer security mechanisms, such as user authentication, frame encryption, and data integrity verification. In various embodiments, the connections between the data provisioning circuitry 126 and the gateway apparatuses 102 may be established and managed via a user interface provided to a user. The user interface may be, for example, a graphical user interface or a web-based user interface accessible via a network (e.g., network 108). For example, the web-based user interface of the sensor apparatus 104 associated with the data provisioning circuitry 126 may be accessible over network 108 from a gateway apparatus 102.

According to various embodiments, the data provisioning circuitry 126 may be configured to provide for transmission of sensor data packets, or messages, to a gateway apparatus 102. The data provisioning circuitry 126 may provide for transmission of a single stream of packets to be distributed to multiple serving network apparatus 106 and/or Internet services by the gateway apparatus 102. The data provisioning circuitry 126 may be configured to specify the destination address of the sensor data packets. In this regard, the data provisioning circuitry 126 may specify the destination address of the sensor data packets to be the address of the gateway apparatus 102. In other embodiments, the data provisioning circuitry 126 may specify the destination address of the sensor data packets to be a multicast address associated with a multicast group to which each of the serving network apparatuses 106 associated with the Internet services attached to the sensor apparatus 104 associated with the data provisioning circuitry 126 has subscribed.

In example embodiments, the data provisioning circuitry 126 may be configured to receive a message from a gateway apparatus 102. The message may comprise an indication of a frequency at which to transmit sensor data packets. In some embodiments, the data provisioning circuitry 126 may be configured to store the requested frequency. The data provisioning circuitry 126 may provide for transmission of sensor data packets at the frequency indicated by the message from the gateway apparatus 102.

Figure 5:
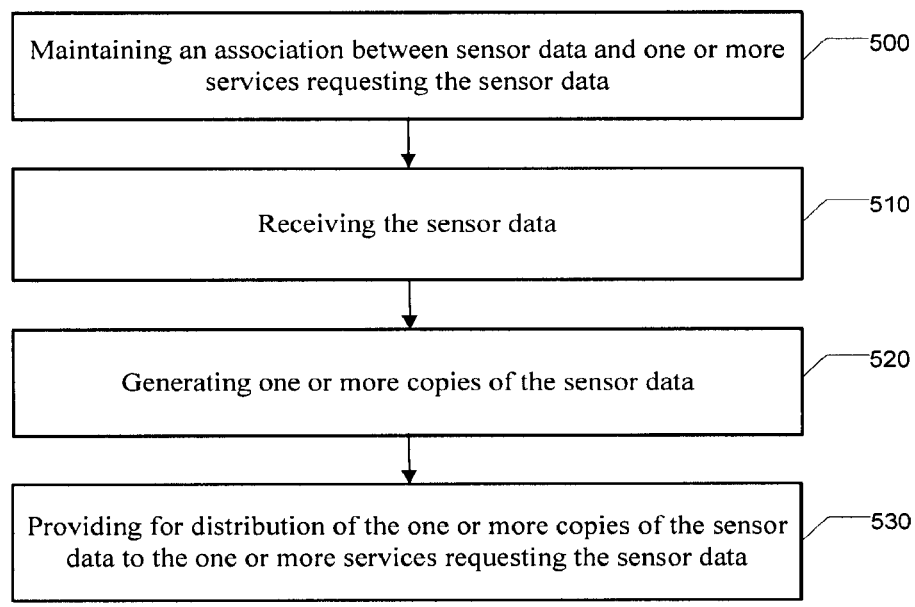
FIG. 5 illustrates a flowchart according to an example method for distributing a single stream of sensor data to one or more services according to some example embodiments of the present invention.

FIG. 5 illustrates a flowchart according to an example method for distributing a single stream of sensor data to one or more services according to an example embodiment. In this regard, FIG. 5 illustrates operations that may be performed at a gateway apparatus 102. The operations illustrated in and described with respect to FIG. 5 may, for example, be performed by, with the assistance of, and/or under the control of one or more of the processor 110, memory 112, communication interface 114, or sensor data distribution circuitry 118. Operation 500 may comprise maintaining an association between sensor data and one or more services requesting the sensor data. The processor 110, memory 112, communication interface 114, user interface 116, and/or sensor data distribution circuitry 118 may, for example, provide means for performing operation 500. Operation 510 may comprise receiving the sensor data. The processor 110, memory 112, communication interface 114, user interface 116, and/or sensor data distribution circuitry 118 may, for example, provide means for performing operation 510. Operation 520 may comprise generating one or more copies of the sensor data. The processor 110, memory 112, communication interface 114, user interface 116, and/or sensor data distribution circuitry 118 may, for example, provide means for performing operation 520. Operation 530 may comprise providing for distribution of the one or more copies of the sensor data to the one or more services requesting the sensor data. One of the one or more copies of the sensor data is provided for distribution to each of the one or more services requesting the sensor data. The processor 110, memory 112, communication interface 114, user interface 116, and/or sensor data distribution circuitry 118 may, for example, provide means for performing operation 530.

FIG. 5 illustrates a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 122, volatile memory 40, or non-volatile memory 42) of a mobile terminal, sensor, server, or other computing device (e.g., the gateway apparatus 102) and executed by a processor (e.g., the processor 120 or processor 20) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The above described functions may be carried out in many ways. For example, any suitable means for carrying out each of the functions described above may be employed to carry out embodiments of the invention. In one embodiment, a suitably configured processor (for example, the processor 110 and/or processor 120) may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium (for example, the memory 112 and/or memory 122), and computer-readable program code portions, such as a series of computer instructions, embodied in the computer-readable storage medium.

It should be noted that while various embodiments of the present invention described herein refer specifically to Bluetooth™ low energy sensors, any number of sensors or low energy sensors may be substituted without departing from the scope of the claimed invention. Furthermore, while several embodiments are described with specific reference to IPv6, it should be understood that the various embodiments of the present invention may be implemented in systems operating in accordance with other standards, such as Internet Protocol version 4 (IPv4).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   maintaining, at a gateway, an association between sensor data and one or more service servers requesting the sensor data from a wireless sensor;
   maintaining, at the gateway, configuration data from the wireless sensor and/or the one or more service servers, the configuration data indicating parameters related to communication between the wireless sensor and the one or more service servers for receiving the sensor data from the wireless sensor;
   receiving, at the gateway, the sensor data comprising a first sensor data packet, wherein the first sensor data packet comprises an indication of a destination address of the first sensor data packet;

generating, by the gateway, one or more copies of the sensor data; and providing, by the gateway, for distribution the one or more copies of the sensor data to the one or more service servers requesting the sensor data, wherein one of the one or more copies of the sensor data is provided for distribution to each of the one or more service servers requesting the sensor data based on the configuration data.

2. The method of claim 1, wherein generating one or more copies of the sensor data further comprises:

extracting the sensor data from the first sensor data packet;

creating a second sensor data packet; and inserting the extracted sensor data from the first sensor data packet into the second sensor data packet.

3. The method of claim 1, wherein generating one or more copies of the sensor data further comprises:

generating one or more copies of the first sensor data packet; and modifying the indication of the destination address of each of the one or more copies of the first sensor data packet, wherein the destination address of each of the one or more copies of the first sensor data packet is modified to an address of a corresponding one of the one or more service servers requesting the sensor data.

4. The method of claim 1, wherein the indication of the destination address of the first sensor data packet comprises a multicast address associated with a multicast group, and wherein providing for distribution of the one or more copies of the sensor data to the one or more service servers requesting the sensor data further comprises:

providing for distribution of the one or more copies of the sensor data to one or more service servers subscribing to the multicast group associated with the multicast address.

5. The method of claim 1, further comprising:

receiving a frequency parameter for each of the one or more service servers requesting the sensor data, wherein the frequency parameter provides an indication of a frequency of sensor data to be provided to the respective service server;

determining the frequency parameter of the received frequency parameters having the highest frequency; and providing for transmission of a request for sensor data at the highest frequency.

6. The method of claim 5, wherein receiving sensor data further comprises receiving sensor data at the frequency indicated by the frequency parameter having the highest frequency, and wherein to provide for distribution of one of the one or more copies of the sensor data to a corresponding one of the one or more service servers requesting the sensor data, the method further comprises:

determining the frequency parameter associated with the one of the one or more service servers requesting sensor data;

sampling the received sensor data at a frequency indicated by the frequency parameter; and providing for transmission of the sampled sensor data to the one of the one or more service servers requesting sensor data.

7. The method of claim 1, further comprising:

providing for display of a user interface, wherein the user interface allows a user to configure the association between the sensor data and the one or more service servers requesting the sensor data.

8. The method of claim 1, further comprising:

accepting a connection from a sensor apparatus providing the sensor data;

connecting to the one or more service servers; and attaching the connection to the sensor apparatus with one or more connections to the one or more service servers.

9. An apparatus comprising:

at least one processor; and at least one memory comprising computer program code, the at least one memory and the computer program code configured to, with the at least one processor, cause the apparatus at least to at least:

maintain an association between sensor data and one or more service servers requesting the sensor data from a wireless sensor;

maintain configuration data from the wireless sensor and/or the one or more service servers, the configuration data indicating parameters related to communication between the wireless sensor and the one or more service servers for receiving the sensor data from the wireless sensor;

receive the sensor data comprising a first sensor data packet, wherein the first sensor data packet comprises an indication of a destination address of the first sensor data packet;

generate one or more copies of the sensor data; and provide for distribution the one or more copies of the sensor data to the one or more service servers requesting the sensor data, wherein one of the one or more copies of the sensor data is provided for distribution to each of the one or more service servers requesting the sensor data based on the configuration data.

10. The apparatus of claim 9, wherein in order to generate one or more copies of the sensor data, the at least one memory and the computer program code are further configured to, with the at least one processor, cause the apparatus to at least:

extract the sensor data from the first sensor data packet;

create a second sensor data packet; and insert the extracted sensor data from the first sensor data packet into the second sensor data packet.

11. The apparatus of claim 9, wherein in order to generate one or more copies of the sensor data, the at least one memory and the computer program code are further configured to, with the at least one processor, cause the apparatus to at least:

generate one or more copies of the first sensor data packet; and modify the indication of the destination address of each of the one or more copies of the first sensor data packet, wherein the destination address of each of the one or more copies of the first sensor data packet is modified to an address of a corresponding one of the one or more service servers requesting the sensor data.

12. The apparatus of claim 9, wherein the indication of the destination address of the first sensor data packet comprises a multicast address associated with a multicast group, and wherein in order to provide for distribution of the one or more copies of the sensor data to the one or more service servers requesting the sensor data, the at least one memory and the computer program code are further configured to, with the at least one processor, cause the apparatus to at least:

provide for distribution of the one or more copies of the sensor data to one or more service servers subscribing to the multicast group associated with the multicast address.

13. The apparatus of claim 9, wherein the at least one memory and the computer program code are further configured to, with the at least one processor, cause the apparatus to at least:
receive a frequency parameter for each of the one or more service servers requesting the sensor data, wherein the frequency parameter provides an indication of a frequency of sensor data to be provided to the respective service server;
determine the frequency parameter of the received frequency parameters having the highest frequency; and
provide for transmission of a request for sensor data at the highest frequency.

14. The apparatus of claim 13, wherein receiving sensor data further comprises receiving sensor data at the frequency indicated by the frequency parameter having the highest frequency, and wherein in order to provide for distribution of one of the one or more copies of the sensor data to a corresponding one of the one or more service servers requesting the sensor data, the at least one memory and the computer program code are further configured to, with the at least one processor, cause the apparatus to at least:
determine the frequency parameter associated with the one of the one or more service servers requesting sensor data;
sample the received sensor data at a frequency indicated by the frequency parameter; and
provide for transmission of the sampled sensor data to the one of the one or more service servers requesting sensor data.

15. The apparatus of claim 9, wherein the at least one memory and the computer program code are further configured to, with the at least one processor, cause the apparatus to at least:
provide for display of a user interface, wherein the user interface allows a user to configure the association between the sensor data and the one or more service servers requesting the sensor data.

16. The apparatus of claim 9, wherein the at least one memory and the computer program code are further configured to, with the at least one processor, cause the apparatus to at least:
accept a connection from a sensor apparatus providing the sensor data;
connect to the one or more service servers; and
attach the connection to the sensor apparatus with one or more connections to the one or more service servers.

17. A non-transitory computer-readable storage medium including computer program code which when executed by at least one processor causes operations comprising:
maintaining, at a gateway, an association between sensor data and one or more service servers requesting the sensor data from a wireless sensor;
maintaining, at the gateway, configuration data from the wireless sensor and/or the one or more service servers, the configuration data indicating parameters related to communication between the wireless sensor and the one or more service servers for receiving the sensor data from the wireless sensor;
receiving, at the gateway, the sensor data comprising a first sensor data packet, wherein the first sensor data packet comprises an indication of a destination address of the first sensor data packet;
generating, by the gateway, one or more copies of the sensor data; and
providing, by the gateway, for distribution the one or more copies of the sensor data to the one or more service servers requesting the sensor data, wherein one of the one or more copies of the sensor data is provided for distribution to each of the one or more service servers requesting the sensor data based on the configuration data.

* * * * *